United States Patent
Bagagli et al.

(10) Patent No.: US 10,267,308 B2
(45) Date of Patent: Apr. 23, 2019

(54) CROSSHEAD-PISTON ROD ASSEMBLY FOR A RECIPROCATING COMPRESSOR

(71) Applicant: Nuovo Pignone Srl, Florence (IT)

(72) Inventors: Riccardo Bagagli, Florence (IT);
Leonardo Tognarelli, Florence (IT);
Francesco Chiesi, Florence (IT);
Tommaso Breschi, Florence (IT)

(73) Assignee: Nuovo Pignone SRL, Florence (IT)

( * ) Notice: Subject to any disclaimer, the term of this patent is extended or adjusted under 35 U.S.C. 154(b) by 194 days.

(21) Appl. No.: 15/032,874

(22) PCT Filed: Oct. 27, 2014

(86) PCT No.: PCT/EP2014/072998
§ 371 (c)(1),
(2) Date: Apr. 28, 2016

(87) PCT Pub. No.: WO2015/063028
PCT Pub. Date: May 7, 2015

(65) Prior Publication Data
US 2016/0281707 A1    Sep. 29, 2016

(30) Foreign Application Priority Data
Oct. 29, 2013    (IT) .............................. CO2013A0055

(51) Int. Cl.
| F16J 15/18 | (2006.01) |
| F04B 53/14 | (2006.01) |
| F04B 39/00 | (2006.01) |
| F16C 5/00  | (2006.01) |
| F16J 1/12  | (2006.01) |

(52) U.S. Cl.
CPC ........ *F04B 53/147* (2013.01); *F04B 39/0022* (2013.01); *F16C 5/00* (2013.01); *F16J 1/12* (2013.01)

(58) Field of Classification Search
CPC ...................................... F16C 5/00; F16J 1/14
See application file for complete search history.

(56) References Cited

U.S. PATENT DOCUMENTS

| 2,930,641 A | 3/1960 | Storey et al. |
| 5,031,512 A * | 7/1991 | Graziani .................. F16C 5/00 |
| | | 92/165 R |
| 5,467,687 A * | 11/1995 | Habegger .......... F04B 39/0022 |
| | | 92/165 R |

FOREIGN PATENT DOCUMENTS

| EP | 1283362 A2 | 2/2003 |
| EP | 1659302 A1 | 5/2006 |

OTHER PUBLICATIONS

International Search Report and written opinion issues in connection with corresponding PCT Application No. PCT/EP2014/072998 dated Jan. 22, 2015.

\* cited by examiner

*Primary Examiner* — Michael Leslie
(74) *Attorney, Agent, or Firm* — GE Global Patent Operation; Marc A. Vivenzio

(57) ABSTRACT

A crosshead-piston rod assembly for a reciprocating compressor comprises a piston rod; a crosshead having a bore; a connection element attached to the piston rod and at least partially inserted into the bore for connecting the crosshead to a piston.

19 Claims, 3 Drawing Sheets

CROSSHEAD-PISTON ROD ASSEMBLY FOR A RECIPROCATING COMPRESSOR

BACKGROUND

Embodiments of the present invention relate to a crosshead-piston rod assembly, specifically in a reciprocating compressor.

In the technical field of reciprocating machines (i.e. machines having a piston moving inside a cylinder such as, for example, internal combustion engines) the piston is usually connected to a crankshaft directly via a connecting rod. Specifically, the connecting rod is linked to the crankshaft via a crankpin. In this arrangement, however, the sideways forces from the connecting rod are transmitted directly to the piston, as the crankpin (and thus the direction the force is applied) moves from side to side with the rotary motion of the crankshaft.

These transverse forces are tolerable in a smaller reciprocating machine. However, in a larger one, such as for example a large reciprocating compressor, this would result in much greater forces, consequently causing an intolerable degree of wear on the piston and cylinder, as well as increasing overall friction.

Therefore, it becomes necessary to decouple the transverse movement of the crankpin from the axial movement of the piston. To perform this function, a crosshead links a piston rod (which is part of the piston) with a connecting rod (which is linked to the crankshaft via the crankpin). The sideways forces transmitted by the connecting rod are absorbed by the crosshead itself, thus allowing the piston rod to move along its axis with negligible transverse load.

A crosshead-piston rod assembly is known in the state of the art, comprising a piston and a crosshead. The piston comprises a head, which is inserted into a cylinder, and a rod attached to the head. The crosshead comprises a main body having a first end linked to the crankshaft and a second end attached to the piston rod. Additionally, the crosshead is provided with bearings attached to the main body and slidably engaged on an internal wall of the cylinder. The bearings themselves absorb the above mentioned sideway forces, allowing the crosshead to maintain the alignment with respect to the longitudinal axis of the piston.

In greater detail, the known crosshead comprises a flange which is attached to the main body, specifically onto the second end. The rod has a shoulder and a neck part. The flange has a through bore into which the rod, specifically the neck part, can fit, while the shoulder of the rod is placed in contact with a surface of the flange. In other words, the rod is partially inserted into the bore of the flange, so that a threaded end emerges from the other side.

To assemble the piston to the crosshead, a nut is screwed onto the threaded end so that the flange is locked between the nut and the shoulder of the rod. The flange is then bolted to the main body of the crosshead. During normal operations of the piston, the loads are mainly of the axial kind. Indeed, this causes a concentration of stress in the zone of the rod between the neck and the shoulder.

The main disadvantage of the known crosshead-piston rod assembly is that such a concentration of stress in a very small area is often enough to bring the material of the rod to plastic deformation, thus compromising the structural integrity of the rod.

BRIEF DESCRIPTION OF THE INVENTION

A first aspect of the invention is therefore directed to a crosshead-piston rod assembly for a reciprocating compressor. This assembly comprises a piston rod and a crosshead having a bore. A connection element is attached to the rod and at least partially inserted into the bore in order to connect the crosshead to the piston.

This achieves the advantage of improving the overall resistance of the assembly, since the connection element is distinct from the piston rod, and therefore it can be made from a stronger material.

Another aspect of the invention relates to the fact that the rod has a contact surface for receiving the connection element, while the connection element itself has a gripping surface for engaging the contact surface of the rod. Indeed, in this way the contact between the rod and the connection element is distributed over a relatively large area, further lowering the mechanical stress in that area.

A third aspect of the invention relates to the fact that the connection element has a first and a second end. The rod has a seat for receiving the first end of the connection element. The above mentioned contact surface is located inside the seat, while the gripping surface is located on the first end of the connection element. This arrangement further improves the stress distribution inside the connection element and the rod, as the stress does not concentrate in a very small area like in the prior art rod.

A fourth aspect of the invention relates to a female thread onto the contact surface of the rod. The connection element comprises a male thread onto the gripping surface, so that it can engage the female thread. This allows an easy assembly of the rod with the connection element.

BRIEF DESCRIPTION OF THE DRAWINGS

Further details and specific embodiments will refer to the attached drawings, in which.

DETAILED DESCRIPTION

The following description of exemplary embodiments refer to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Referring to the attached figures, with the number 1 is indicated a crosshead-piston rod assembly according to an embodiment of the present invention. The crosshead-piston rod assembly 1 comprises a piston rod 4 and a crosshead 3.

Indeed, the piston rod 4 itself can be connected to a piston head (not shown in the figures) in order to define a piston.

The piston rod 4 can thus provide the head with a reciprocating motion so that it can, for example, compress a working fluid in a cylinder (not part of the present invention and not shown in the attached figures). For example, the working fluid can be hydrogen, carbon dioxide, methane, ethylene or mixtures of hydrocarbons.

Figure 2:
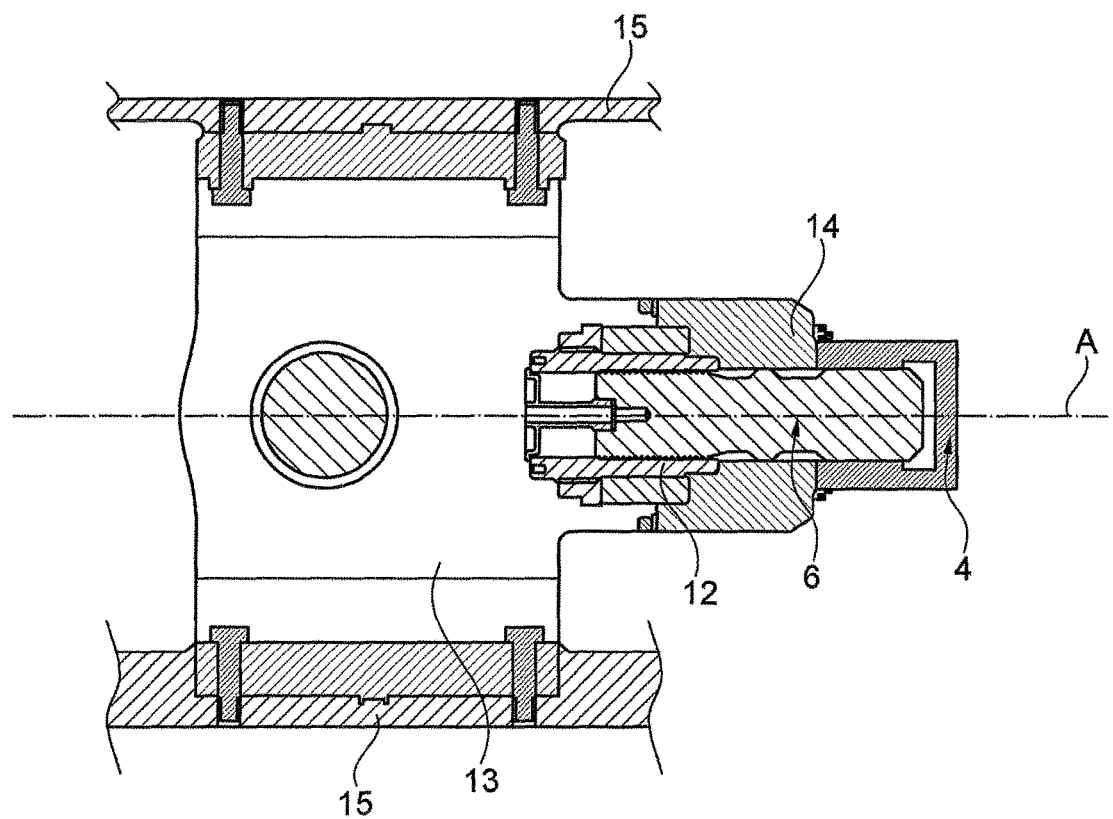
FIG. 2 is a longitudinal sectional view of the crosshead-piston rod assembly of FIG. 1.

Indeed, the piston rod 4 develops along a longitudinal axis "A". In other words, the piston rod 4 is elongated in the direction of the longitudinal axis "A", as shown in FIG. 2. In operation, the rod slides along the longitudinal axis "A" in order to move the head of the piston.

For linking to the piston, in particular to the piston rod 4, the crosshead 3 is provided with a bore 5. Furthermore, the assembly 1 comprises a connection element 6. This connection element 6 is linked to the piston rod 4 and at least partially inserted into the bore 5, so that it connects the crosshead 3 to the piston.

More particularly, it is therefore possible to make the connection element 6 from a different material with respect to the piston rod 4. Specifically, it is a benefit to realize the connection element 6 from a stronger material and the piston rod 4 from a lower cost material, since the connection element 6 is subject to a higher mechanical stress as it will be apparent from a following part of the present disclosure.

With more detail, the piston rod 4 has a contact surface 7 for receiving the connection element 6. The connection element 6 has a gripping surface 8 that is able to engage the contact surface 7 of the piston rod 4. Specifically, it is to be noted that the interaction between the gripping surface 8 and the contact surface 7 is distributed over a wide area. This is a benefit, since it favors an overall lower mechanical stress.

Indeed, the connection element 6 develops along the longitudinal axis "A" of the piston rod 4. Specifically, the connection element 6 and the piston rod 4 are coaxial. More particularly, the connection element 6 is symmetrical with respect to the longitudinal axis "A".

In greater detail, the connection element 6 has a first 6a and a second end 6b. The piston rod 4 has a seat 4a for receiving the first end 6a of the connection element 6. In other words, the first end 6a of the connection element 6 fits inside the seat 4a of the piston rod 4.

The piston rod 4 is provided with an abutment surface 16 which defines an edge of the seat 4a. Furthermore, the abutment surface 16 is oriented transversally with respect to the longitudinal axis "A", more particularly perpendicularly.

Figure 3:
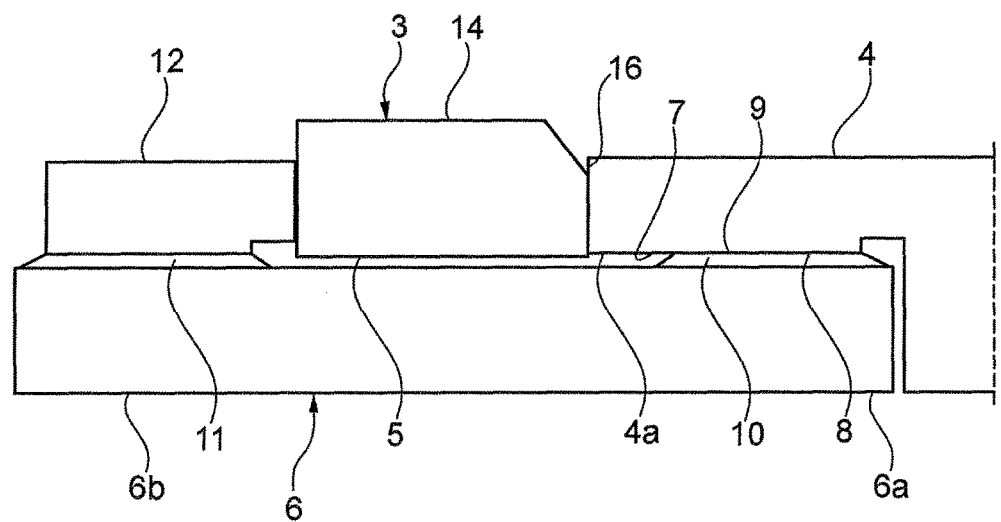
FIG. 3 is a schematic longitudinal sectional view of a detail of the crosshead-piston rod assembly of FIGS. 1 and 2.

As shown in FIG. 3, the above mentioned contact surface 7 is located inside the seat 4a. The gripping surface 8 is located on the first end 6a of the connection element 6.

Furthermore, the seat 4a is substantially cylindrical. Consequently, the first end 6a of the connection element 6 is also cylindrical, thereby ensuring a precise coupling with the seat 4a of the piston rod 4.

With further detail, the piston rod 4 comprises a female thread 9 onto the contact surface 7. The connection element 6 comprises a male thread 10 onto the gripping surface 8, so as to engage the female thread 9.

As shown in FIG. 2, the connection element 6 has the shape of a tie bolt, which works primarily under an axial load. To apply this load during assembly, the connection element 6 comprises a further male thread 11 located more particularly on the second end 6b. The assembly 1 further comprises a nut 12 attached to the connection element 6, more particularly onto the second end 6b. Specifically, the nut 12 is screwed onto the further male thread 11 of the connection element 6.

The crosshead 3 comprises a main body 13, onto which sliding shoes 15 are attached. The sliding shoes 15 are themselves known to the person skilled in the art, and will therefore not be described in further detail.

The crosshead 3 also comprises a flange 14, which is attached to the main body 13. The function of the flange 14 is to make the assembly easier, as the piston rod 4 can be linked to the flange 14 before the flange 14 itself is connected to the main body 13.

Figure 1:
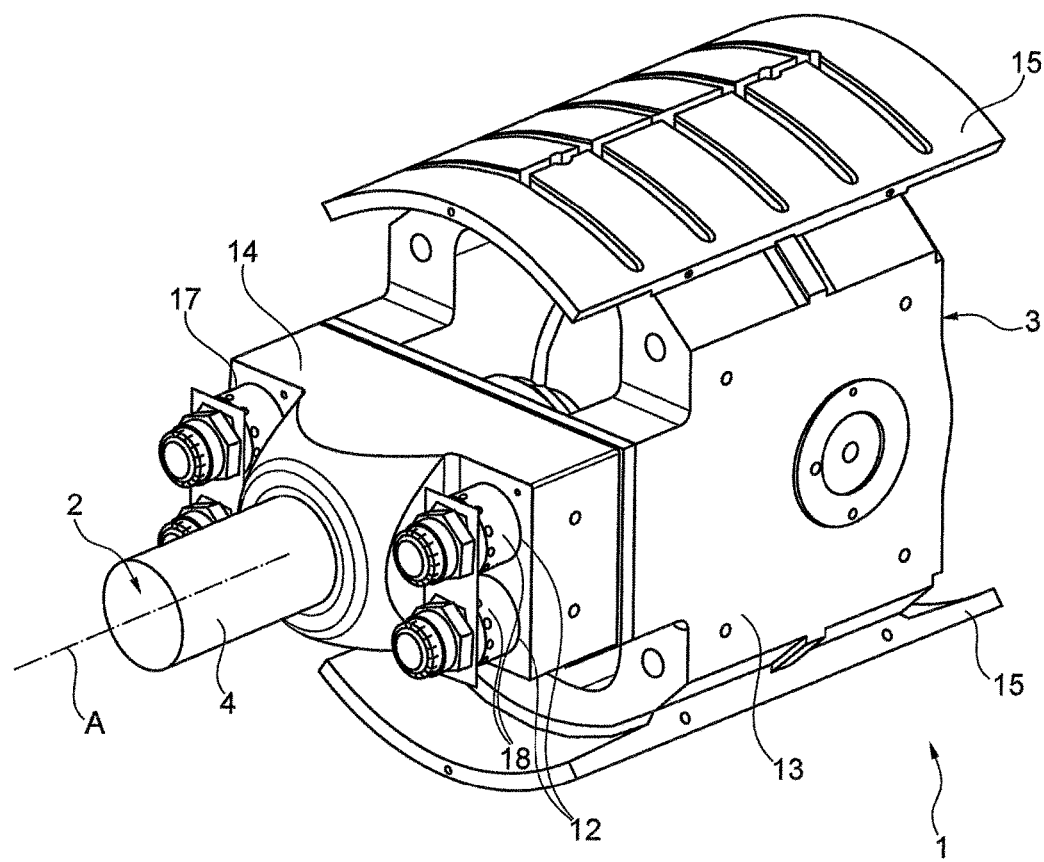
FIG. 1 is a perspective view of a crosshead-piston rod assembly according to an embodiment of the present invention.

As shown in FIG. 1, in an embodiment the flange 14 is a plate, more particularly a moderately thick plate. The above mentioned bore 5 is located in a central zone of the flange 14. Also, the bore 5 extends through the flange 14, more particularly along the longitudinal axis "A" of the piston rod 4. In other words, in operating conditions the bore 5 is aligned to the longitudinal axis "A" of the piston rod 4.

Indeed, the connection element 6 extends through the bore 5 across the flange 14. In other words, the connection element 6 crosses the flange 14. The above described abutment surface 16 is therefore placed in contact with the flange 14. The screwing of the nut 12 onto the second end 6b provides the connection element 6 with an axial load, thereby pressing the abutment surface 16 against the flange 14.

A plurality of holes 17 are located on the flange 14. Specifically, the holes 17 ere located on two sides 14a of the flange 14. With more detail, the flange 14 has two holes 17 on each side 14a. A bolt 18 is provided for each hole 17, in order to attach the flange 14 to the main body.

The assembling operation of the piston rod 4 with the crosshead 3 is as follows. The connection element 6 is attached to the piston rod 4. Specifically, the first end 6a of the connection element 6 is screwed into the seat 4a of the piston rod 4. The connection element 6 is therefore inserted into the bore 5 of the flange 14. The nut 12 is screwed onto the second end 6b of the connection element 6, thereby securing the flange 14 against the piston rod 4, in particular on the abutment surface 16. The flange 14 is therefore attached to the main body 13. Specifically, the bolts 16 are installed each in its respective hole 17.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A crosshead piston rod assembly for a reciprocating compressor, the crosshead piston rod assembly comprising:
   a piston rod having an abutment surface and defining a longitudinal axis;
   a crosshead having a bore and comprising a main body;
   a connection element attached to the piston rod and at least partially inserted into the bore for connecting the crosshead to a piston, the connection element having a first end and a second end and the piston rod having a seat for receiving the first end of the connection element;
   a flange attached to the main body of the crosshead and defining a bore therethough; and
   a nut attached to the second end of the connection element to fix the flange against the abutment surface of the piston rod, wherein the bore of the crosshead and the bore of the flange are coaxially aligned along the longitudinal axis of the piston rod, the connection element extends through the bore of the flange, and the flange is abuttingly contacted by the nut on one end and the abutment surface of the piston rod on an opposite end such that the flange is locked between the nut and the piston rod.

2. The crosshead piston rod assembly according to claim 1, wherein the piston rod has a contact surface to receive the connection element, and the connection element has a gripping surface to engage the contact surface of the piston rod.

3. The crosshead piston rod assembly according to claim 2, wherein the contact surface is located inside the seat and the gripping surface is located on the first end of the connection element.

4. The crosshead piston rod assembly according to claim 3, wherein the contact surface of the piston rod comprises a female thread and the gripping surface of the connection element comprises a male thread to engage the female thread of the contact surface.

5. The crosshead piston rod assembly according to claim 4 wherein the connection element comprises a male thread on the second end.

6. The crosshead piston rod assembly according to claim 1, wherein the seat is substantially cylindrical.

7. The crosshead piston rod assembly according to claim 1, wherein the connection element is coaxial with respect to the longitudinal axis of the piston rod.

8. The crosshead piston rod assembly according to claim 7, wherein the connection element is symmetrical with respect to the longitudinal axis of the piston rod.

9. The crosshead piston rod assembly according to claim 1, wherein the abutment surface of the piston rod is perpendicularly orientated relative to the longitudinal axis of the piston rod.

10. The crosshead piston rod assembly according to claim 1, wherein the flange defines holes to receive corresponding bolts to attach the flange to the main body.

11. The crosshead piston rod assembly according to claim 10, wherein the holes each define longitudinal axes that are parallel to the longitudinal axis of the piston rod.

12. A reciprocating compressor comprising the crosshead-piston rod assembly according to claim 1.

13. The reciprocating compressor according to claim 12, wherein the piston rod has a contact surface to receive the connection element, and the connection element has a gripping surface to engage the contact surface of the piston rod.

14. The reciprocating compressor according to claim 12, wherein the contact surface is located inside the seat and the gripping surface is located on the first end of the connection element.

15. The reciprocating compressor according to claim 14, wherein the contact surface of the piston rod comprises a female thread and the gripping surface of the connection element comprises a male thread for engaging the female thread of the contact surface.

16. The reciprocating compressor according to claim 12, wherein the seat is substantially cylindrical.

17. The reciprocating compressor according to claim 12, wherein the connection element is coaxial with respect to the longitudinal axis of the piston rod.

18. The reciprocating compressor according to claim 17, wherein the connection element is symmetrical with respect to the longitudinal axis of the piston rod.

19. A method for assembling a crosshead and a piston, the method comprising:
providing:
 a piston rod having an abutment surface and defining a longitudinal axis;
 a crosshead having a bore and comprising a main body;
 a connection element attached to the piston rod and at least partially inserted into the bore for connecting the crosshead to the piston, the connection element having a first end and a second end each comprising male threads thereon, wherein the piston rod has a seat for receiving the first end of the connection element;
 a flange attached attachable to the main body of the crosshead and defining a bore therethough; and
 a nut;
screwing the connection element into the seat of the piston rod;
inserting the connection element into the bore of a flange;
screwing the nut onto the second end of the connection element to fix the flange against the abutment surface of the piston rod; and
after screwing the nut onto the second end of the connection element, fixing the flange to the main body of the crosshead,
wherein, when assembled, the bore of the crosshead and the bore of the flange are coaxially aligned along the longitudinal axis of the piston rod, the connection element extends through the bore of the flange, and the flange is abuttingly contacted by the nut on one end and the abutment surface of the piston rod on an opposite end such that the flange is locked between the nut and the piston rod.

* * * * *